(12) United States Patent
Copeland

(10) Patent No.: US 7,805,879 B1
(45) Date of Patent: Oct. 5, 2010

(54) BAITING A FISH HOOK WITH SAFETY AND PROFICIENCY

(76) Inventor: Thomas A. Copeland, 10 Maple La., Denville, NJ (US) 07834

( * ) Notice: Subject to any disclaimer, the term of this patent is extended or adjusted under 35 U.S.C. 154(b) by 127 days.

(21) Appl. No.: 11/937,181

(22) Filed: Nov. 8, 2007

(51) Int. Cl.
*A01K 97/00* (2006.01)
(52) U.S. Cl. ................................. 43/4; 43/1; 43/4.5
(58) Field of Classification Search .............. 43/1, 43/4, 4.5, 55
See application file for complete search history.

(56) References Cited

U.S. PATENT DOCUMENTS

| 731,335 | A |   | 6/1903 | Blanchet |  |
|---|---|---|---|---|---|
| 2,458,671 | A | * | 1/1949 | Zirbel | 43/4 |
| 2,502,816 | A |   | 4/1950 | Bennek |  |
| 2,518,590 | A |   | 8/1950 | Andrist |  |
| 2,682,126 | A | * | 6/1954 | Shepherd | 269/254 CS |
| 2,763,956 | A |   | 9/1956 | Olson |  |
| 2,787,080 | A |   | 4/1957 | Wells |  |
| 2,847,789 | A | * | 8/1958 | Parkman | 43/1 |
| 2,857,705 | A |   | 10/1958 | Woodcock |  |
| 2,883,788 | A |   | 4/1959 | Stitt |  |
| 3,098,312 | A |   | 7/1963 | Shannon |  |
| 3,308,570 | A |   | 3/1967 | Horton |  |
| 3,461,590 | A | * | 8/1969 | Gindele | 43/4 |
| 3,964,201 | A | * | 6/1976 | Biliunas et al. | 43/4 |
| 3,964,204 | A | * | 6/1976 | McKinley | 43/55 |
| 3,975,853 | A | * | 8/1976 | Aaron | 43/4 |
| 4,118,881 | A | * | 10/1978 | McFarlane | 43/4 |
| 4,161,837 | A | * | 7/1979 | Johnston | 43/4 |
| 4,843,753 | A |   | 7/1989 | Mace |  |
| 4,979,326 | A |   | 12/1990 | Aaron |  |
| 5,377,445 | A |   | 1/1995 | Brannon |  |
| 6,637,145 | B2 | * | 10/2003 | Reed | 43/4 |

* cited by examiner

*Primary Examiner*—Christopher P Ellis
(74) *Attorney, Agent, or Firm*—Arthur Jacob

(57) ABSTRACT

A fish hook is baited by placing a morsel of bait in a well located at the top end of a block having a slot extending along a side of the block. The slot is located relative to the well such that upon placing the shank of the fish hook in the slot, with the tip of the hook confronting the well and aligned with the bait in the well, and then drawing the shank along the slot, the bait is impaled upon the tip of the hook with safety and with accuracy. The baited hook then is withdrawn from the block in a direction which militates against inadvertent pulling of the tip of the hook out of the bait.

8 Claims, 3 Drawing Sheets

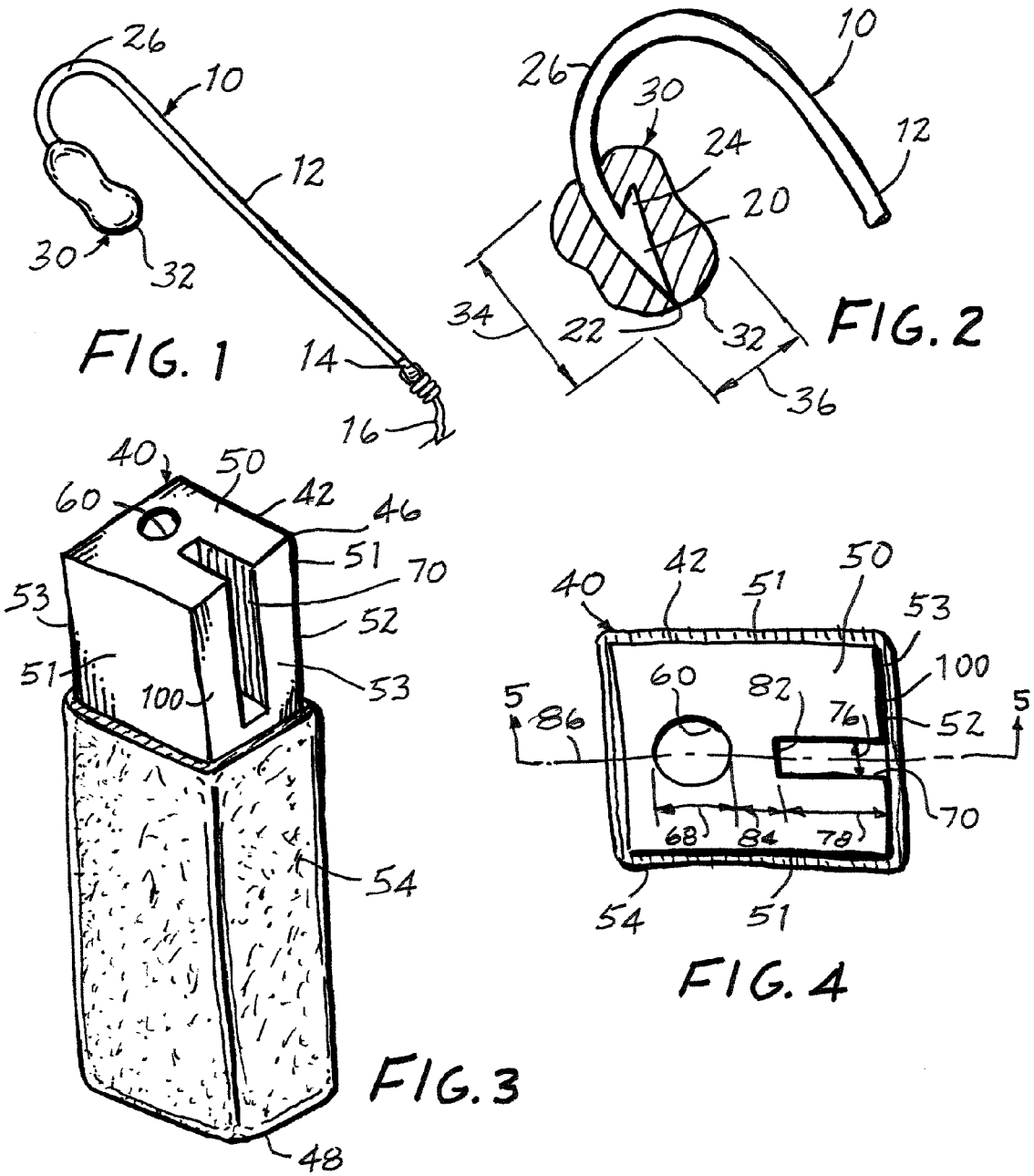

BAITING A FISH HOOK WITH SAFETY AND PROFICIENCY

The present invention relates generally to recreational fishing and pertains, more specifically, to promoting safety as well as proficiency in connection with baiting a fish hook, especially among children first learning the art of angling.

Since the inception of fishing as a sport, often referred to as "angling", a term usually attributed to Izaak Walton's writings in the seventeenth century, recreational fishing has grown immensely in popularity. Over the years, as recreational fishing has spread to anglers of all ages, an almost infinite variety of equipment has been offered for use by those seeking to enjoy the sport. In that connection, various aids have been developed for teaching children to practice the sport.

The present invention assists anglers and, in particular, children in developing proficiency, together with increased safety in connection with baiting a fish hook. As such, the present invention attains several objects and advantages, some of which are summarized as follows: Assists in baiting a fish hook with increased safety and a high degree of proficiency; simplifies the proper placement of bait on a fish hook, with increased ease and safety; provides early learners, and especially children first learning to practice recreational fishing, with the ability to bait a fish hook safely and with a high degree of accuracy; encourages the development of safe and proficient practices in connection with recreational fishing; enables increased success in catching fish, through more accurate placement of bait on a fish hook, thereby promoting recreation through the sport of fishing; simplifies the task of baiting a fish hook with increased proficiency and safety; provides a relatively inexpensive addition to an angler's equipment, capable of effective use over a relatively long service life.

The above objects and advantages, as well as further objects and advantages, are attained by the present invention, which may be described briefly as a device for promoting safety and accuracy while baiting a fish hook with a pellet-like bait having an exterior surface and given dimensions, the hook including a longitudinally extending shank having a given transverse dimension, and a tip spaced laterally from the shank for receiving the bait, the device comprising: a block having a top end and a bottom end, a top face, and a front face extending in a longitudinal direction between the top face and the bottom end; a grip on the block for enabling the block to be held during a baiting operation; a well having an opening at the top face and extending into the block, the well having a limited dimension corresponding generally to at least a portion of prescribed dimensions of the bait such that the bait will be received selectively for temporary retention in the well while exposed at the opening; and a slot in the block, the slot having an open end at the top face of the block, a length extending in a longitudinal direction along the front face, a transverse width corresponding to the transverse dimension of the shank of the hook, and a lateral depth establishing a lateral terminal boundary of the slot; the well and the terminal boundary of the slot being placed in a common longitudinal plane and being spaced apart by a lateral distance such that upon placement of the bait in the well, and the shank of the hook within the slot, with the tip of the hook confronting the top face of the block and the shank engaged with the terminal boundary of the slot, the tip will be aligned with and guided toward the well as the shank is drawn along the slot in a baiting direction to engage the tip with the bait in the well.

In addition, the present invention provides a method for promoting safety and accuracy while baiting a fish hook with a pellet-like bait having an exterior surface and given dimensions, the hook including a longitudinally extending shank having a given transverse dimension, and a tip spaced laterally from the shank for receiving the bait, the method comprising: gripping a block having a top face and a front face depending from the top face and extending in a longitudinal direction; placing the bait within a well in the block, the well having an opening at the top face and a limited depth extending into the block and corresponding generally to a prescribed dimension of the bait such that the bait is received selectively for temporary retention in the well while exposed at the opening; engaging the shank of the hook with a slot in the block, with the tip of the hook confronting the top face of the block, the slot having an open end at the top face of the block, a length extending in a longitudinal direction along the front face, a transverse width corresponding to the transverse dimension of the shank of the hook, and a lateral depth establishing a lateral boundary juxtaposed with the top face and spaced laterally from the well; aligning the tip of the hook with the well; and with the shank of the hook guided by the slot, drawing the shank along the slot in a baiting direction toward the well to insert the tip into the bait in the well.

The invention will be understood more fully, while still further objects and advantages will become apparent, in the following detailed description of preferred embodiments of the invention illustrated in the accompanying drawing, in which:

FIG. 1 is a pictorial view of a typical fish hook baited properly with a morsel of bait;

FIG. 2 is an enlarged fragmentary view of a portion of the fish hook, with the bait shown in cross-section to reveal the proper placement of the bait on the hook;

FIG. 3 is a pictorial view of a device constructed in accordance with the present invention for assisting in baiting the fish hook;

FIG. 4 is an enlarged top plan view of the device;

Figure 5:
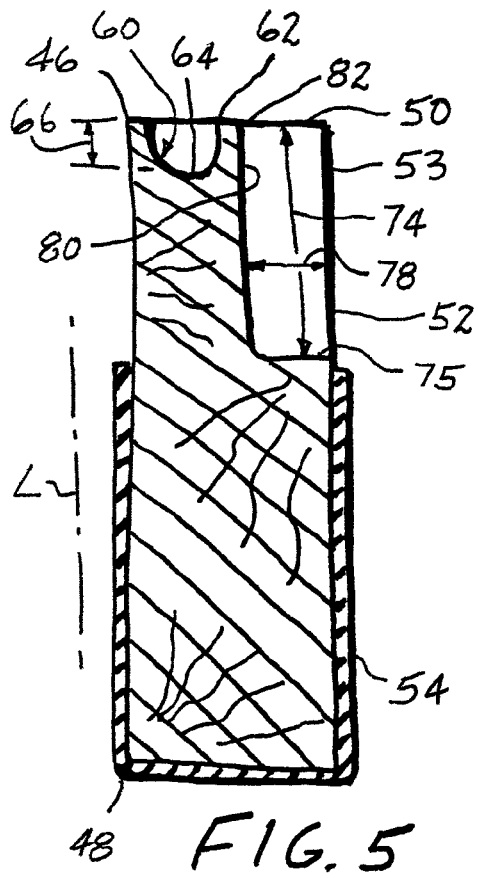
FIG. 5 is a longitudinal cross-sectional view taken along line 5-5 of FIG. 4.

Referring now to the drawing, and especially to FIGS. 1 and 2 thereof, a conventional fish hook 10 is seen to have a shank 12, an eye 14 at one end of the shank 12 for attachment of the hook 10 to a fish line 16, and a tip 20 having a sharp point 22 and an adjacent barb 24. Shank 12 extends in a longitudinal direction and has a given transverse dimension which, in the illustrated embodiment, comprises the diameter of shank 12. An arched segment 26 spaces tip 20 laterally away from the longitudinally extending shank 12. Hook 10 is shown properly baited, that is, a morsel to be offered to fish, illustrated in the form of a pellet-like bit of bait 30, is affixed to hook 10 at tip 20. When properly located on the hook 10, bait 30 is placed, with some degree of accuracy, precisely at the tip 20, to assure that tip 20 is at the ready for hooking a fish that may strike at the bait 30.

Thus, as best seen in FIG. 2, tip 20 is embedded within bait 30, with point 22 hidden, but placed in such close juxtaposition with the external surface 32 of the bait 30 as to be ready for immediate engagement upon being drawn into the mouth of the fish and set. Bait 30 can be a natural bait, such as a salmon egg or a grub, or may be an artificial bait created of a material and in a configuration simulating a natural food found in the vicinity, such as an insect larva, a worm, a grub, or a manufactured edible bait formulated to appeal to the particular fish being sought. In the illustrated embodiment, bait 30 is in the form of a popular artificial manufactured edible bait, created to simulate a maggot. As such, bait 30 is provided with prescribed dimensions which, in this instance, comprise a length 34 and a width 36. All of these baits, whether natural or artificial, can be relatively small in size and a modicum of skill is required in order to place such bait at the most desirable position on a fish hook, with accuracy and with safety.

Turning now to FIGS. 3 through 5, in order to assist an angler in baiting a hook as described above, a device 40, constructed in accordance with the present invention, provides a combination of structural elements which enables quick and easy location and affixation of bait 30 on hook 10. Device 40 includes a block 42, shown in the form of a simple parallelepipedon 44, preferably constructed of a buoyant material, such as wood, or a buoyant synthetic polymeric material, which allows the device 40 to float, facilitating retrieval if dropped in water, and provided with a bright external color for facilitating location of the device 40 in a crowded tackle box or in grass or on water. Block 42 extends in a longitudinal direction L between a top end 46 and a bottom end 48 and includes a top face 50 which extends along the top end 46, between transversely opposite sides 51 and between laterally opposite sides 53, and a front face 52 which depends from the top face 50 to extend longitudinally along one side 53 of the block 42, between top end 46 and bottom end 48. A grip in the form of a hand grip 54 is located adjacent the bottom end 48 for enabling an angler to grip and hold block 42 during a baiting operation, as will be described below.

A well 60 has an opening 62 at the top face 50 of block 42, the well 60 extending downwardly into the block 42. Well 60 has limited dimensions, including a limited depth 66, between the top face 50 and the bottom 64 of the well 60, and a span 68 across the opening 62, the limited depth 66 corresponding generally to at least a portion of the length 34 of bait 30, while the span 68 corresponds generally to the width 36 of bait 30. Typical dimensions, provided by way of example only, are a length between top end 46 and bottom end 48 of about two-and-one-half to three inches, lateral and transverse widths between corresponding laterally opposite and transversely opposite sides 53 and 51, respectively, of about three-quarters of an inch, with well 60 having a depth 66 of about one-quarter of an inch and a span 68 of about one-eighth of an inch. Hand grip 54 extends along approximately three-quarters of the length of the block 42.

A slot 70 extends into the block 42 and has an open end 72 at the top face 50 of the block 42, a limited length 74 extending downwardly in a longitudinal direction along the front face 52 to a terminal end 75, a transverse width 76 and a depth 78 which extends into the block 42 in a lateral direction and establishes a lateral terminal boundary 80 of slot 70 and an edge 82 juxtaposed with the top face 50 and spaced laterally from the well 60 by a lateral distance 84. The transverse width 76 of slot 70 corresponds essentially to the diameter of shank 12, for purposes to be described hereinafter.

Figure 6:
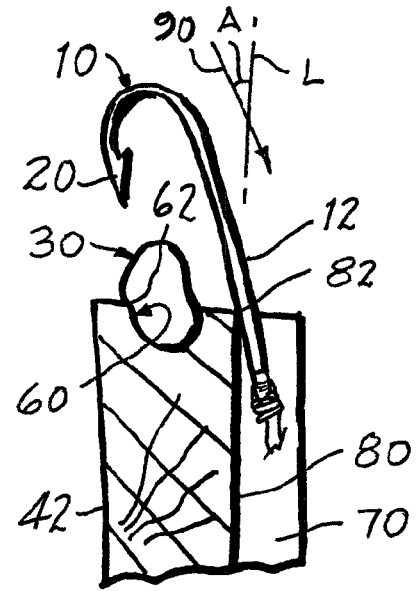
FIGS. 6 through 8 are fragmentary longitudinal cross-sectional views demonstrating a method of baiting the hook, utilizing the device shown in FIGS. 3 through 5.
Figure 7:
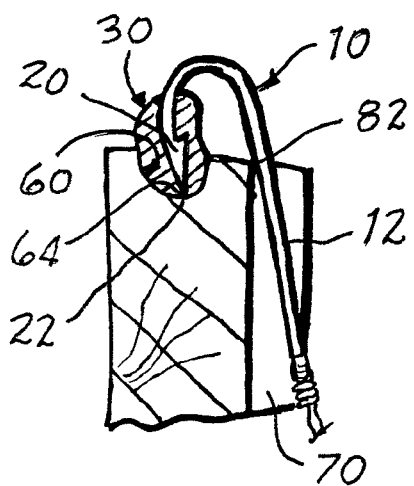

Referring now to FIGS. 5 through 7, as well as to FIGS. 1 through 4, when it is desired to carry out a baiting operation, that is, to bait hook 10 with bait 30, an angler will grasp block 42 at hand grip 54 and insert bait 30 into well 60. The relative dimensions and configurations of the bait 30 and the well 60 enables such selective placement of bait 30 within well 60 to be accomplished with ease, even by a young child, the bait 30 being received within the well 60 for temporary retention in the well 60 while exposed at the opening 62, as seen in FIG. 6. The well 60 and the terminal boundary 80 of slot 70 are placed in a common longitudinal plane 86, and the lateral distance 84 between the well 60 and the terminal boundary 80 of the slot 70 is such that upon placement of the bait 30 in the well 60, and location of the shank 12 of the hook 10 within the slot 70, with the tip 20 of the hook 10 confronting the top face 50 of the block 42, as shown in FIG. 6, the tip 20 can be aligned readily with the well 60 and guided by the slot 70 toward the well 60 as the shank 12 is drawn along the slot 70 in a baiting direction 90 to engage the tip 20 with the bait 30 located in the well 60. The position of the edge 82, spaced laterally from the well 60 by the lateral distance 84, enables the shank 12 of the hook 10 to be engaged with the edge 82 as the shank 12 is drawn along the slot 70, to stabilize the hook 10 as the tip 20 is inserted into the bait 30, as seen in FIG. 7.

The limited depth 66 of the well 60 assures that upon placement of the bait 30 in the well 60, the bait 30 will engage the bottom 64 of the well 60 and upon drawing the shank 12 of the hook 10 along the slot 70 in the baiting direction 90 to insert the tip 20 of the hook 10 into the bait 30, the bait 30 will be impaled upon the tip 20, and the tip 20 will be precluded from emerging beyond point 22 being in close juxtaposition with the exterior surface 32 of the bait 30, as illustrated in FIG. 2. To that end, the bottom 64 of the well 60, which is coextensive with the exterior surface 32 of the bait 30, serves to stop point 22 of the tip 20 of the hook 10 from projecting beyond the desired close juxtaposition. In this manner, the bait 30 readily is located accurately upon hook 10 for best presentation to a fish, and for best performance in setting the hook 10 once a fish accepts the bait 30.

Figure 8:
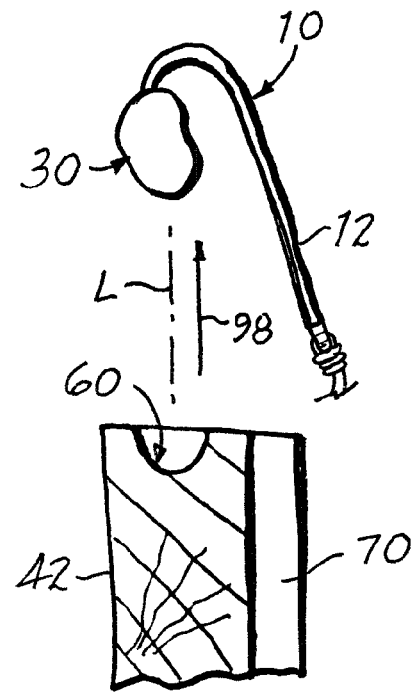

The relative location of the well 60 and the edge 82 enables the baiting direction 90 to make an acute angle A with the longitudinal direction L so that upon subsequent withdrawal of the hook 10 and the bait 30 along a longitudinal withdrawal direction 98, the tip 20 will be withdrawn from the well 60 along the longitudinal direction L, transverse to the baiting direction 90, to militate against inadvertent pulling of the tip 20 out of the bait 30, as might otherwise occur if withdrawal were to be along the baiting direction 90, and thereby assure that the bait 30 remains securely impaled on the tip 20 as the shank 12 is lifted from the slot 70, as seen in FIG. 8. This arrangement is of particular importance when using a hook which has no barb, as is common among anglers who practice fishing purely for sport.

Block 42 is most economically constructed in the form of a parallelepipedon, however, other shapes are available in effecting the baiting of a hook as described above. The parallelepipedon is preferred in that the shape is simple and provides flat surfaces 100 extending longitudinally along the block 42, the flat surfaces 100 serving to deter the block 42 from rolling and thereby inadvertently getting away from the angler. Other shapes can be provided with at least one flat surface for militating against such rolling away of the device.

It is noted that the top face 50 of block 42 extends in transverse directions relative to common plane 86 and has an extent which places the top face 50 below the tip 20 of any hook 10 which may be so misaligned with the well 60 as to place the tip 20 outside the common plane 86 as the shank 12 of the hook 10 is drawn along slot 70 in the baiting direction 90. The point 22 of tip 20 of any such misaligned hook 10 will engage the top face 50 of the block 42 and will be precluded from piercing the hand, or a finger, of the angler using the device 40, thereby promoting safety during the performance of a baiting operation, especially among younger children who tend to be less coordinated. The flat surface 100 provided along front face 52 deters sideways sliding of shank 12 away from slot 70 when shank 12 is being inserted into slot 70 and assists in such insertion.

Figure 9:
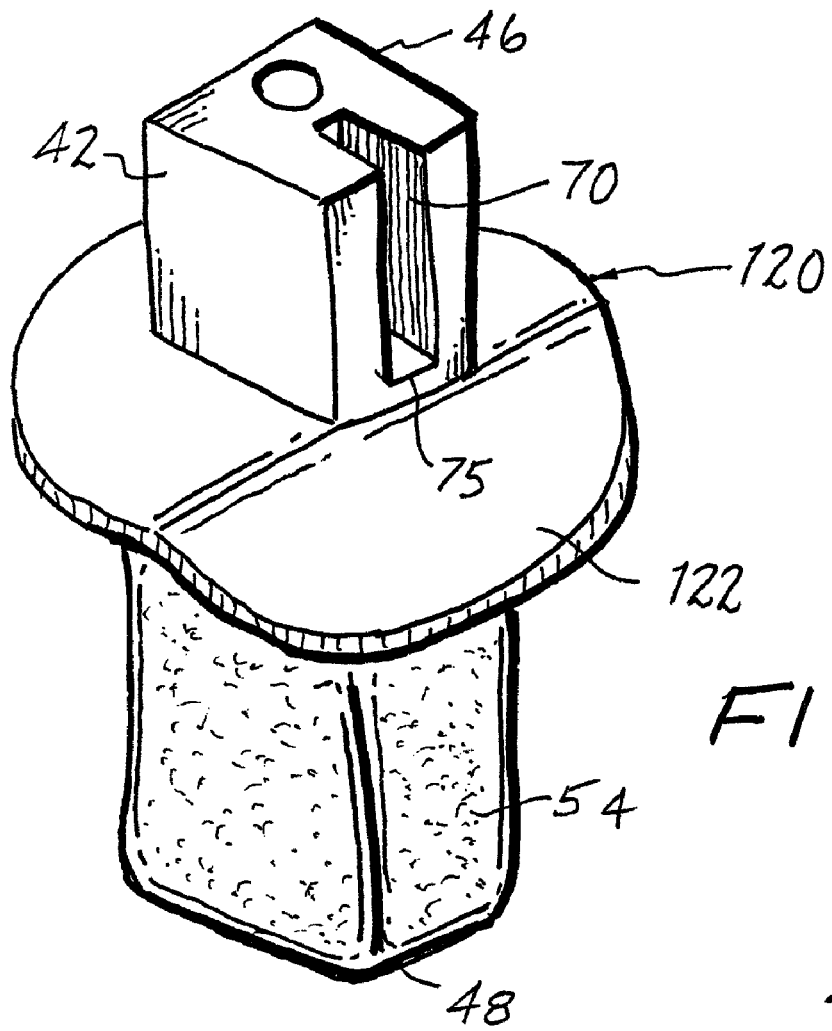
FIG. 9 is a pictorial view of an alternate embodiment constructed in accordance with the present invention.
Figure 10:
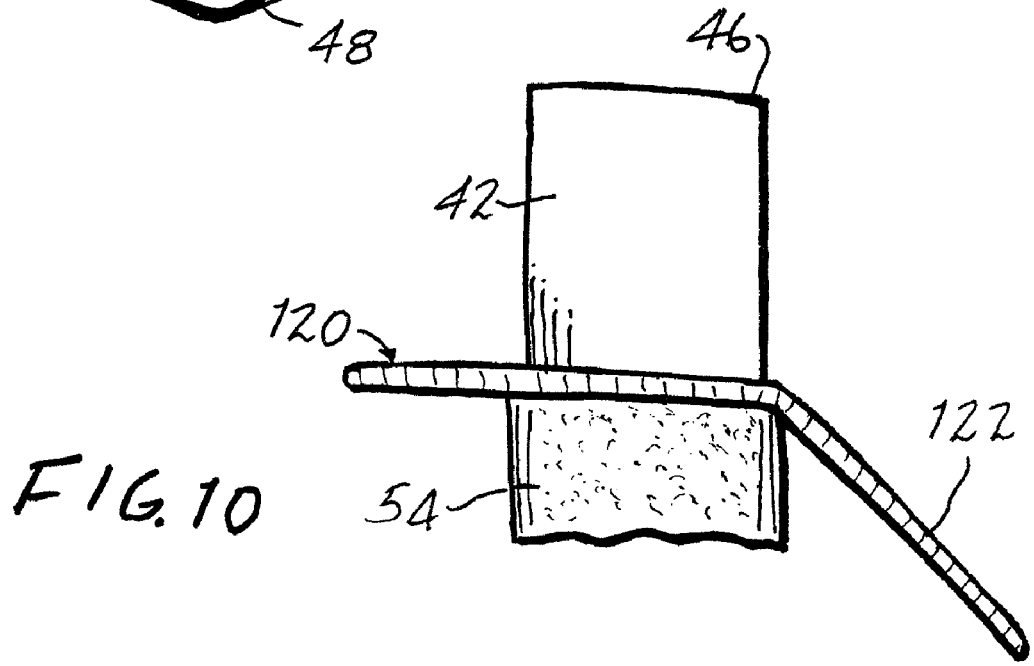
FIG. 10 is a fragmentary side elevational view of the embodiment of FIG. 9.

In the embodiment illustrated in FIGS. 9 and 10, safety is enhanced further by the addition of a shield 120 placed intermediate the top end 46 and the bottom end 48 of the block 42, above the hand grip 54. Shield 120 extends in lateral and transverse directions from the block 42 so as to shield the hand grip 54 from the tip 20 of any misdirected hook 10 during a baiting operation. In the preferred construction, the shield 120 is located between the bottom end 48 of the block 42 and the terminal end 75 of slot 70 so as to lie above the hand grip 54, and includes a shield portion 122 which slopes in a direction extending longitudinally away from the top face 50 and laterally away from the terminal end 75 of the slot 70 so as to facilitate insertion of the shank 12 of a hook 10 into slot 70 and subsequent drawing of the shank 12 along the slot 70 during a baiting operation. Portion 122 also serves to engage the angler's baiting hand as the shank 12 is drawn in the baiting direction so as to prevent excessive downward movement of the baiting hand which otherwise could result in the tip 20 of the hook 10 reaching the gripping hand of the angler. Thus, portion 122 promotes further safety.

It will be seen that the present invention attains all of the objects and advantages summarized above, namely: Assists in baiting a fish hook with increased safety and a high degree of proficiency; simplifies the proper placement of bait on a fish hook, with increased ease and safety; provides early learners, and especially children first learning to practice recreational fishing, with the ability to bait a fish hook safely and with a high degree of accuracy; encourages the development of safe and proficient practices in connection with recreational fishing; enables increased success in catching fish, through more accurate placement of bait on a fish hook, thereby promoting recreation through the sport of fishing; simplifies the task of baiting a fish hook with increased proficiency and safety; provides a relatively inexpensive addition to an angler's equipment, capable of effective use over a relatively long service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A device for promoting safety and accuracy while baiting a fish hook with a pellet-like bait having an exterior surface and given dimensions, the hook including a longitudinally extending shank having a given transverse dimension, and a tip spaced laterally from the shank for receiving the bait, the device comprising:
   a block having a top end and a bottom end, a top face, and a front face extending in a longitudinal direction between the top face and the bottom end;
   a grip on the block for enabling the block to be held during a baiting operation;
   a well having an opening at the top face and extending into the block, the well having a limited dimension corresponding generally to at least a portion of prescribed dimensions of the bait such that the bait will be received selectively for temporary retention in the well while exposed at the opening;
   a slot in the block, the slot having an open end at the top face of the block, a length extending in a longitudinal direction along the front face, a transverse width corresponding to the transverse dimension of the shank of the hook, and a lateral depth establishing a lateral terminal boundary of the slot;
   the well and the terminal boundary of the slot being placed in a common longitudinal plane and being spaced apart along the top face by a lateral distance such that upon placement of the bait in the well, and the shank of the hook within the slot, with the tip of the hook confronting the top face of the block and the shank engaged with the terminal boundary of the slot, the tip will be aligned with and guided toward the well as the shank is drawn along the slot in a baiting direction to engage the tip with the bait in the well;
   the slot terminating at a terminal end spaced longitudinally from the top face; and
   a shield extending in lateral and transverse directions from the block, between the grip and the terminal end of the slot, for shielding the grip from a tip of any misdirected hook during a baiting operation, the shield including a shield portion sloping in a direction extending longitudinally away from the top face and laterally away from the terminal end of the slot so as to facilitate drawing of the shank of the hook along the slot during a baiting operation.

2. The device of claim 1 wherein the well includes a bottom, and a depth between the top face and the bottom, the depth being limited so as to assure that upon placement of the bait in the well, the bait will engage the bottom, and upon drawing the shank of the hook along the slot in the baiting direction to insert the tip of the hook into the bait, the bait will be impaled upon the tip and the tip will be precluded from emerging beyond being in close juxtaposition with the exterior surface of the bait.

3. The device of claim 1 including an edge established by the lateral terminal boundary of the slot, the edge being spaced from the well by a lateral spacing which enables the baiting direction to make an angle with the longitudinal direction such that upon subsequent withdrawal of the hook and the bait along a longitudinal withdrawal direction, the tip will be withdrawn from the well along the longitudinal direction to militate against pulling of the tip out of the bait and thereby assure that the bait remains securely impaled on the tip as the shank is withdrawn from the slot.

4. The device of claim 1 wherein the top face extends in transverse directions relative to the common longitudinal plane for being engaged by the tip of any hook so misaligned with the well as to place the tip outside the common longitudinal plane as the shank is drawn along the baiting direction.

5. The device of claim 1 wherein the front face includes a flat surface.

6. The device of claim 1 wherein the block includes at least one flat surface extending between the top end and the bottom end of the block.

7. A method for promoting safety and accuracy while baiting a fish hook with a pellet-like bait having an exterior surface and given dimensions, the hook including a longitudinally extending shank having a given transverse dimension, and a tip spaced laterally from the shank for receiving the bait, the method comprising:

gripping a block having a top face and a front face depending from the top face and extending in a longitudinal direction;

placing the bait within a well in the block, the well having an opening at the top face and a limited depth extending into the block and corresponding generally to a prescribed dimension of the bait such that the bait is received selectively for temporary retention in the well while exposed at the opening;

engaging the shank of the hook with a slot in the block, with the tip of the hook confronting the top face of the block, the slot having an open end at the top face of the block, a length extending in a longitudinal direction along the front face, a transverse width corresponding to the transverse dimension of the shank of the hook, and a lateral depth establishing a lateral boundary juxtaposed with the top face and spaced laterally from the well;

aligning the tip of the hook with the well; and with the shank of the hook guided by the slot, drawing the shank along the slot in a baiting direction toward the well to insert the tip into the bait in the well.

8. The method of claim 7 wherein the shank is drawn along the slot so that the baiting direction makes an angle with the longitudinal direction, and subsequently withdrawing the hook and the bait along a longitudinal withdrawal direction, whereby the tip is withdrawn from the well along the longitudinal direction to militate against pulling of the tip out of the bait and thereby assure that the bait remains securely impaled on the tip as the shank is withdrawn from the slot.

* * * * *